(12) United States Patent
Kharod et al.

(10) Patent No.: US 8,751,438 B2
(45) Date of Patent: Jun. 10, 2014

(54) DATA EXTRACTION, TRANSFORMATION, AND LOADING

(75) Inventors: Manish G. Kharod, Tampa, FL (US); Nityanand Sharma, Tampa, FL (US); Sutap Chatterjee, Tampa, FL (US); Kopinath Ratnam, Tamilnadu (IN); Hrishikesh Premkumar, Tamilnadu (IN); Ganesh R. Bhathivi, Wesley Chapel, FL (US); Bhaskar R. Gudlavenkatasiva, Temple Terrace, FL (US); Josy John, Wesley Chapel, FL (US); Naseemunnisa Hussain, Andhra Pradesh (IN); Salman Fariz, Tamilnadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 145 days.

(21) Appl. No.: 13/446,604

(22) Filed: Apr. 13, 2012

(65) Prior Publication Data

US 2013/0275360 A1 Oct. 17, 2013

(51) Int. Cl.
*G06F 17/00* (2006.01)

(52) U.S. Cl.
USPC ............. 707/602; 707/600; 707/802; 706/45; 706/62

(58) Field of Classification Search
None
See application file for complete search history.

(56) References Cited

U.S. PATENT DOCUMENTS

| | | | | |
|---|---|---|---|---|
| 7,761,406 B2* | 7/2010 | Harken | ......................... | 707/602 |
| 8,219,518 B2* | 7/2012 | Jin et al. | ........................ | 707/602 |
| 8,504,513 B2* | 8/2013 | Aski et al. | ...................... | 707/602 |
| 2002/0046301 A1* | 4/2002 | Shannon et al. | .............. | 709/328 |
| 2005/0187974 A1* | 8/2005 | Gong | .......................... | 707/104.1 |
| 2005/0251533 A1* | 11/2005 | Harken et al. | ............. | 707/104.1 |
| 2005/0256892 A1* | 11/2005 | Harken | ......................... | 707/101 |
| 2005/0262192 A1* | 11/2005 | Mamou et al. | ................ | 709/203 |
| 2008/0168082 A1* | 7/2008 | Jin et al. | ........................ | 707/102 |
| 2011/0125705 A1* | 5/2011 | Aski et al. | ...................... | 707/602 |
| 2012/0271865 A1* | 10/2012 | Jin et al. | ........................ | 707/810 |

* cited by examiner

*Primary Examiner* — Hung Le

(57) ABSTRACT

A device receives instructions for extracting, transforming, and loading data; identifies a plurality of data processing activities based on the instructions; and determines a processing sequence for performing the plurality of data processing activities. The device further creates a plurality of processing objects corresponding to the plurality of data processing activities. Each one of the plurality of processing objects including a discrete data structure that is produced by performing a corresponding one of the plurality of data processing activities. The device performs the plurality of data processing activities in accordance with the processing sequence and by using the plurality of processing objects.

20 Claims, 7 Drawing Sheets

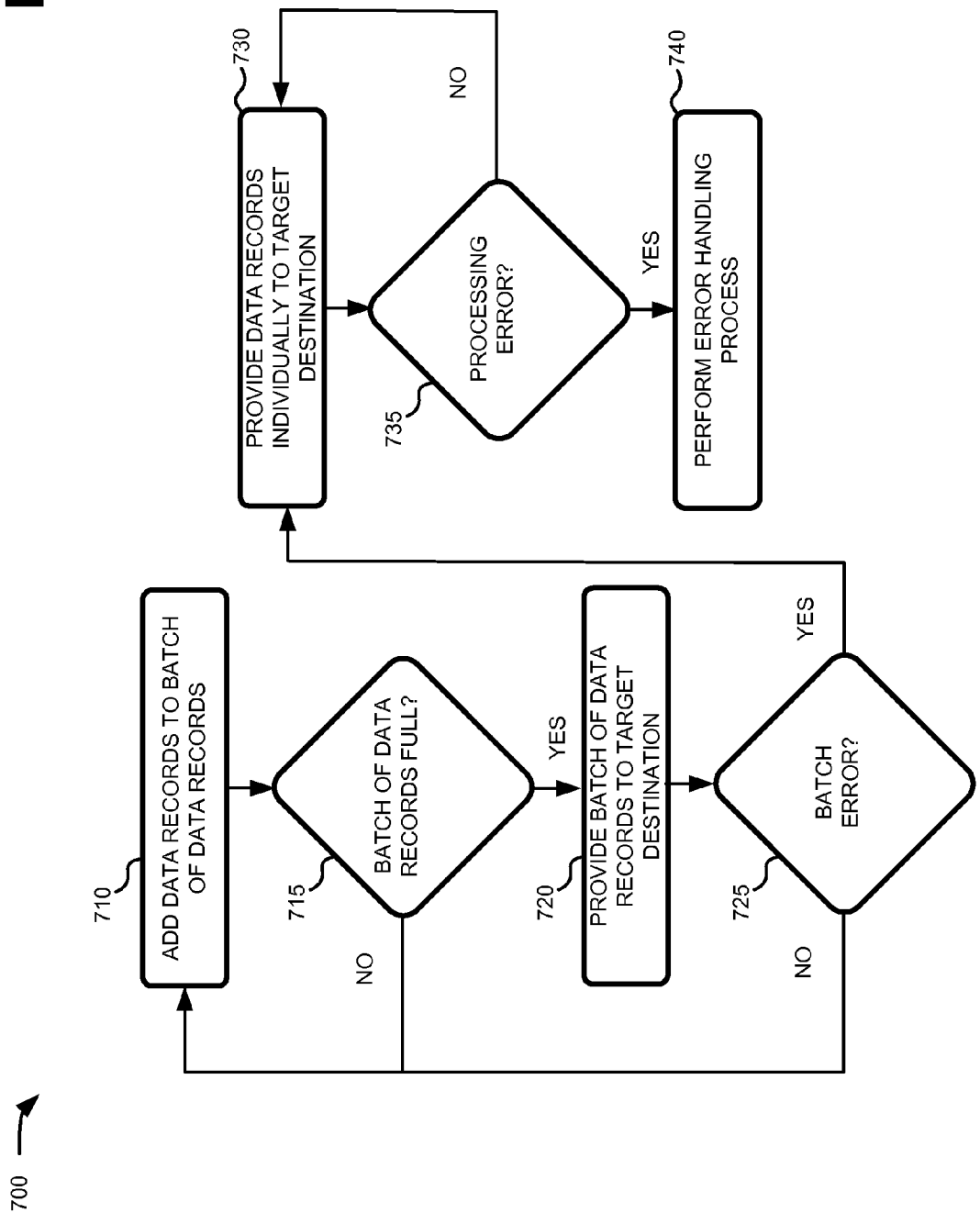

DATA EXTRACTION, TRANSFORMATION, AND LOADING

BACKGROUND

Organizations collect data from various sources that store the data in different ways. Various data management technologies exist for handling such data. However, these technologies often require too many system resources (e.g., processing capacity, memory capacity, etc.) and/or time when processing large amounts of data from different sources.

BRIEF DESCRIPTION OF THE DRAWINGS

FIG. 7 is a flow chart of an example process for processing batches of data.

DETAILED DESCRIPTION OF PREFERRED EMBODIMENTS

Figure 1:
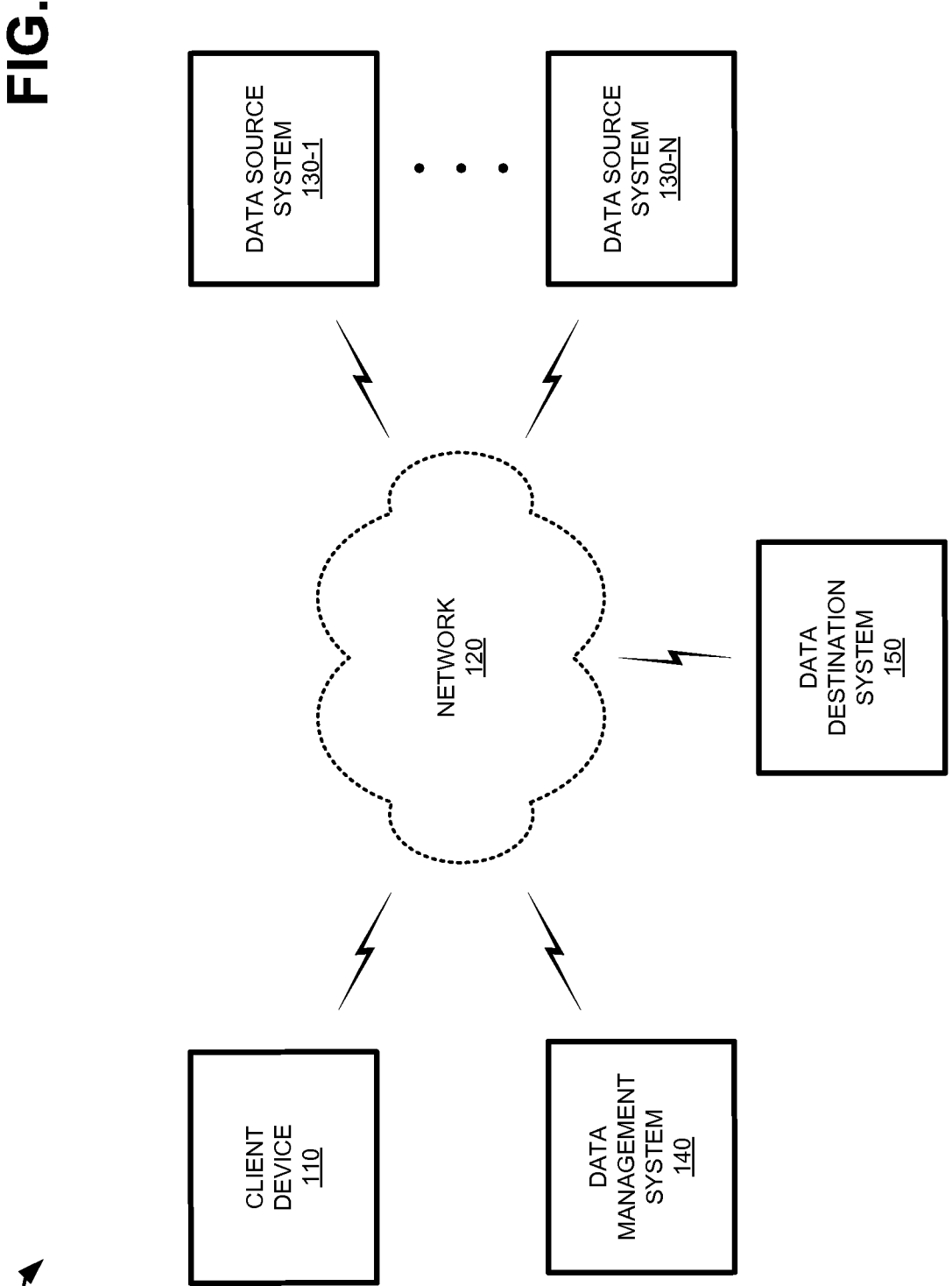
FIG. 1 is a diagram of an example environment in which systems and/or methods, described herein, may be implemented.

The following detailed description refers to the accompanying drawings. The same labels and/or reference numbers in different drawings may identify the same or similar elements.

A data management system may include a data warehouse that receives different types of data from different enterprise systems. The data warehouse may manipulate the data (e.g., by transforming all of the data into a particular format) so that the data can be stored and/or used by the data warehouse.

Systems and/or methods, described herein, may be used to provide efficient solutions for extract, transform, and load (ETL) technologies. In one example, a data management system may receive ETL instructions that are in a particular programming language, such as an Extensible Markup Language (XML), and in one or more other types of programming languages. The ETL instructions may include a variety of information, such as instructions for performing various ETL activities. Examples of ETL activities may include extracting, receiving, and/or otherwise obtaining data from a data source (e.g., a server, a data file, an array, a table, etc.); transforming and/or otherwise processing the data in a particular manner (e.g., sorting the data, merging the data, formatting the data, detecting, reporting, and resolving errors in the data, etc.); and/or loading or otherwise providing the data to a target destination (e.g., a server, a storage device, a table, a database, a data file, etc.). The data management system may identify the ETL activities based on the ETL instructions. The data management system may also, or alternatively, identify dependencies that may exist between the ETL activities. For example, the data management system may identify scenarios where a particular ETL activity cannot be performed until another ETL activity has started or been completed. The data management system may also determine a processing sequence in which to perform the ETL activities.

In accordance with the processing sequence, the data management system may perform the ETL activities by using processing objects. A processing object may include a discrete data structure with data that is produced by performing a particular ETL activity. For instance, a processing object may correspond to an object-oriented programming language object (e.g., a Java object) that is associated with a table of data records that is obtained by performing an ETL activity that includes extracting data from a data source. The processing object (instead of the entire table of data records) may then be referenced to perform other ETL activities, such as sorting the table of data records, deleting duplicate data records, providing the data records to a target location, etc. Using processing objects to perform ETL activities may increase efficiency by reducing the system resources required to perform each ETL activity.

The data management system may also, or alternatively, perform ETL activities using in-memory processes. For instance, to perform an ETL activity of sorting a particular set of data, the data management system may read the data into an in-memory data structure, such as an in-memory table, an in-memory database, etc., and may sort the data within the in-memory data structure according to a sort key or another type of attribute. Using in-memory processes for performing ETL activities may increase efficiency by reducing or eliminating a need to read and write data between volatile memory (e.g., random access memory (RAM)) and non-volatile memory (e.g., a hard disk drive).

In addition, the data management system may process data in batches when performing ETL activities. For example, when a particular ETL activity involves processing a quantity of data that exceeds a particular threshold, the data management system may partition the data into separate batches of data, and may perform the ETL activity on the batches of data separately. Performing ETL activities on batches of data may increase efficiency by reducing the processing overhead that might otherwise result from processing much larger quantities of data. Accordingly, systems and/or methods, described herein may enhance ETL services by using processing objects, in-memory processes, and/or by processing data in batches.

FIG. 1 is a diagram of an example environment 100 in which systems and/or methods, described herein, may be implemented. As depicted, environment 100 may include a client device 110, a network 120, data source systems 130-1, . . . , 130-N (where N≥1) (hereinafter referred to collectively as "data source systems 130," and individually as "data source system 130"), a data management system 140, and a data destination system 150. The number of systems and/or networks, illustrated in FIG. 1, is provided for explanatory purposes only. In practice, there may be additional systems and/or networks, fewer systems and/or networks, different systems and/or networks, and/or differently arranged systems and/or networks than illustrated in FIG. 1.

Alternatively, or additionally, in some implementations, one or more of the systems of environment 100 may perform one or more functions described as being performed by another one or more of the systems of environment 100. Systems of environment 100 may interconnect via wired connections, wireless connections, or a combination of wired and wireless connections.

Client device 110 may include any type of computing device. For example, client device 110 may include a desktop computer, a laptop computer, a netbook computer, a tablet computer, a radiotelephone, a personal communications system (PCS) terminal (e.g., that may combine a cellular radiotelephone with data processing capabilities), a personal digital assistant (PDA) (e.g., that can include a radiotelephone, a pager, Internet/intranet access, etc.), or another type of computing device. Client device 110 may communicate via network 120 with one or more of the systems of environment 100.

Network 120 may include any type of network and/or combination of networks. For example, network 120 may include a local area network (LAN), a wireless LAN (WLAN) (e.g., an 802.11 network), a wide area network (WAN) (e.g., the Internet), a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, and/or a Worldwide Interoperability for Microwave Access (WiMAX) network, etc.). Additionally, or alternatively, network 120 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network.

Data source system 130 may include any type of computing device or a combination of computing devices. For example, data source system 130 may include a user device (e.g., a mobile telephone, a laptop computer, a tablet computer, a netbook computer, a desktop computer, etc.), a network device (e.g., a server, a cluster of servers, etc.), etc. Data source system 130 may store data in any format or arrangement, such as in databases, tables made up of rows and columns, data files with comma-separated values (CSV), etc. Data source system 130 may provide data to management system 140 via network 120. In one example implementation, data source systems 130 may include multiple enterprise systems.

Data management system 140 may include any type of computing device or a combination of computing devices, such as a data warehouse. For instance, data management system 140 may include a desktop computer, a server, a cluster of servers, and/or another type of computing device. In some implementations, data management system 140 may receive, from client device 110, commands, rules, and/or instructions (e.g., ETL instructions). In one example, based on the instructions, data management system 140 may receive or retrieve data from data source systems 130, may process the data in a particular manner, and/or may provide the processed data to data destination system 150. In some implementations, data management system 140 may provide, to client device 110, information (e.g., such as status information, error reports, output reports, etc.) associated with activities that are based on the ETL instructions.

Data destination system 150 may include any type of computing device or a combination of computing devices. For example, data destination system 150 may include a user device (e.g., a mobile telephone, a laptop computer, a tablet computer, a netbook computer, a desktop computer, etc.), a network device (e.g., a server, a cluster of servers, etc.), etc. Data destination system 150 may receive data that has been processed by data management system 140, and may store the processed data in any form, format, style, or manner of storage, such as in one or more tables, one or more data files, and/or another type of data storage arrangement.

Figure 2:
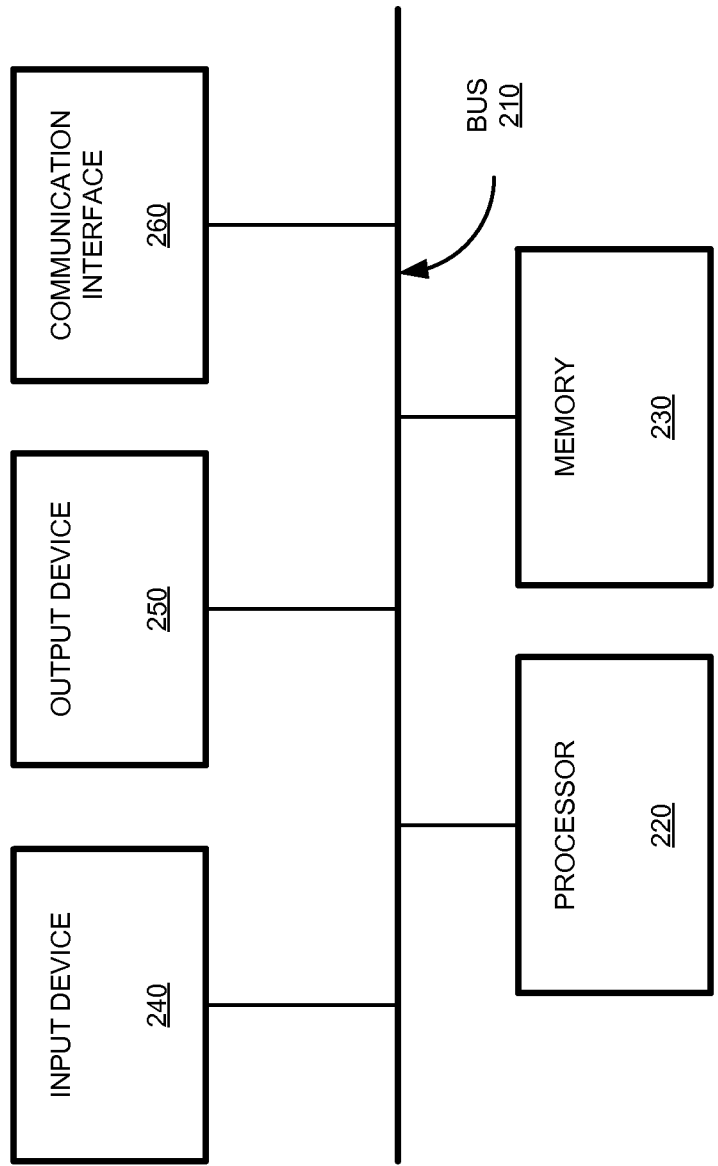
FIG. 2 is a diagram of example components of a device that may correspond to one of the devices of the environment depicted in FIG. 1.

FIG. 2 is a diagram of example components of a device 200. Device 200 may correspond to client device 110, data storage system 130, data management system 140, and/or data destination system 150. Alternatively, or additionally, each of client device 110, data storage system 130, data management system 140, and/or data destination system 150 may include one or more of devices 200 and/or one or more of the components of device 200.

As shown in FIG. 2, device 200 may include a bus 210, a processor 220, a memory 230, an input device 240, an output device 250, and a communication interface 260. In other implementations, device 200 may contain fewer components, additional components, different components, and/or differently arranged components than depicted in FIG. 2. Additionally, or alternatively, one or more components of device 200 may perform one or more tasks described as being performed by one or more other components of device 200.

Bus 210 may permit communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), and/or one or more other components that may interpret or execute instructions or data. Memory 230 may include any type of dynamic storage device that may store information and instructions, for execution by processor 220, and/or any type of non-volatile storage device that may store information for use by processor 220.

Input device 240 may include one or more components that permit a user to input information into device 200. For example, input device 240 may include a keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type of wireless or wired interface. Communication interface 260 may also include an antenna (or a set of antennas) that permit wireless communication, such as the transmission and reception of radio frequency (RF) signals.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or read-only memory (ROM). A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processor 220 to perform one or more processes described herein. Alternatively, hardwired circuitry may be used in place of, or in combination with, software instructions to implement processes described herein. Thus, implementations described herein are not limited to any specific combination of hardware circuitry and software.

Figure 3:
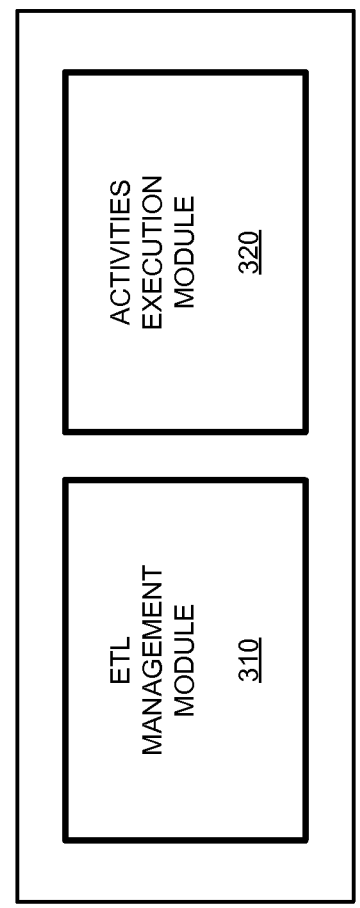
FIG. 3 is a diagram of example functional components of a data management system of FIG. 1.

FIG. 3 is a diagram of example functional components of data management system 140. In one example implementation, the function described in connection with FIG. 3 may be performed by device 200 (FIG. 2) and/or by one or more components of device 200. As shown in FIG. 3, data management system 140 may include an ETL management module 310 and an activities execution module 320.

ETL management module 310 may include functionality for managing ETL instructions and ETL activities. For example, ETL management module 310 may receive ETL instructions, and may identify ETL activities based on the ETL instructions. ETL management module 310 may also identify activity dependencies that may correspond to one or more of the ETL activities, and may establish a processing sequence for performing the ETL activities based on the activity dependencies. Additionally, or alternatively, ETL management module 310 may ensure that ETL activities are executed in accordance with the ETL instructions by, for example, selecting ETL activities for execution, and monitoring the execution of the ETL activities until the ETL activities are completed.

Activities execution module 320 may include functionality for performing ETL activities. For example, activities execution module 310 may use processing objects to perform the ETL activities identified by ETL management module 310. In some implementations, activities execution module 320 may also, or alternatively, perform the ETL activities using in-memory processes. Additionally, or alternatively, when an ETL activity involves a quantity of data that exceeds a particular threshold, activities execution module 320 may divide the data into discrete batches of data and perform the ETL activity separately on each of the batches of data.

In addition to the functionality described above, ETL management module 310 and/or activities execution module 320 of data management system 140 may also, or alternatively, include functionality as described elsewhere in this specification. Additionally, or alternatively, one or more of the functions or operations of data management system 140 may be performed by another device or group of devices. Further, while FIG. 3 shows a particular number and arrangement of modules, in alternative implementations, data management system 140 may include additional modules, fewer modules, differently arranged modules, and/or different modules than those depicted.

Figure 4:
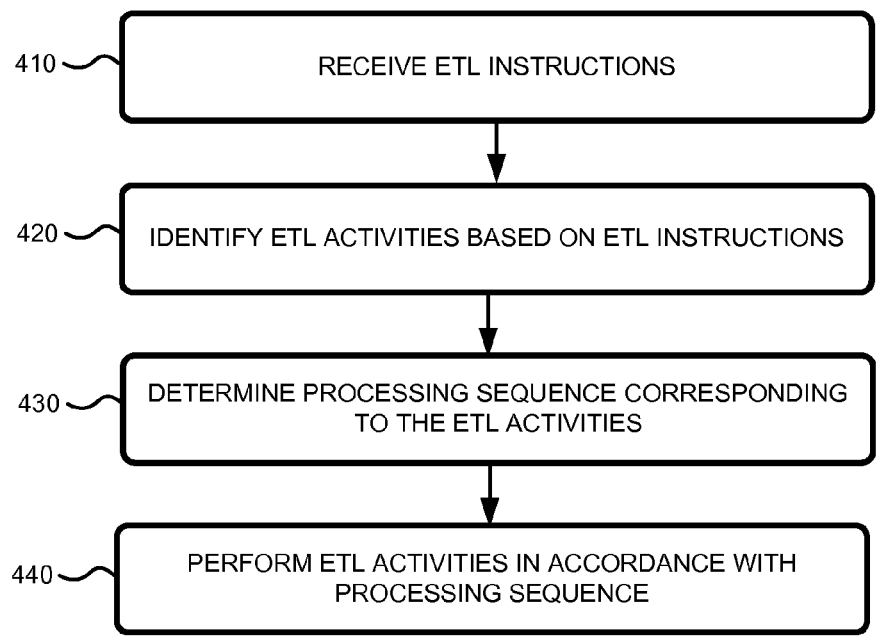
FIG. 4 is a flow chart of an example process for performing extract, transform, and load (ETL) activities.

FIG. 4 is a flow chart of an example process 400 for performing ETL activities. In some implementations, process 400 may be performed by data management system 140. Alternatively, or additionally, some or all of process 400 may be performed by one or more other devices, or a group of devices, including or excluding data management system 140.

As shown in FIG. 4, process 400 may include receiving ETL instructions (block 410). For example, data management system 140 may receive ETL instructions from client device 110, an operator of data management system 140, and/or another type of source. Data management system 140 may receive ETL instructions that vary by form, type, content, and/or other types of characteristics. In some implementations, data management system 140 may receive the ETL instructions in the form of a data file (e.g., an XML file, etc.).

Process 400 may further include identifying ETL activities based on the ETL instructions (block 420). For example, data management system 140 may parse the ETL instructions into ETL activities. As discussed above, examples of ETL activities may include extracting or otherwise obtaining data from one or more sources (e.g., data source system 130), transforming or otherwise processing the data in a particular manner (e.g., sorting the data in a particular manner, merging the data with other data, deleting duplicate data, etc.), and providing the processed data to a target destination (e.g., data destination system 150).

Process 400 may also include determining a processing sequence corresponding to the ETL activities (block 430). For example, data management system 140 may analyze the ETL instructions and/or the identified ETL activities in order to develop an order or sequence in which the ETL activities are to be performed. In some implementations, this may include identifying processing dependencies that may exist between certain ETL activities. For instance, an ETL activity that involves sorting data may be dependent upon an ETL activity that involves gathering the data. Similarly, an ETL activity that involves merging two sets of data may be dependent upon one or more ETL activities that involve sorting each set of data separately.

Process 400 may also include performing the ETL activities in accordance with the processing sequence (block 440). For example, data management system 140 may provide ETL services, as specified by the ETL instructions, by executing or otherwise performing the identified ETL activities in accordance with the processing sequence. Data management system 140 may perform the ETL activities using one or more of the operations described above, such as creating processing objects to perform ETL activities, using in-memory processes to perform ETL activities, and/or using batches of data to perform ETL activities. Examples of these operations are described below with reference to FIGS. 5-7.

Figure 5:
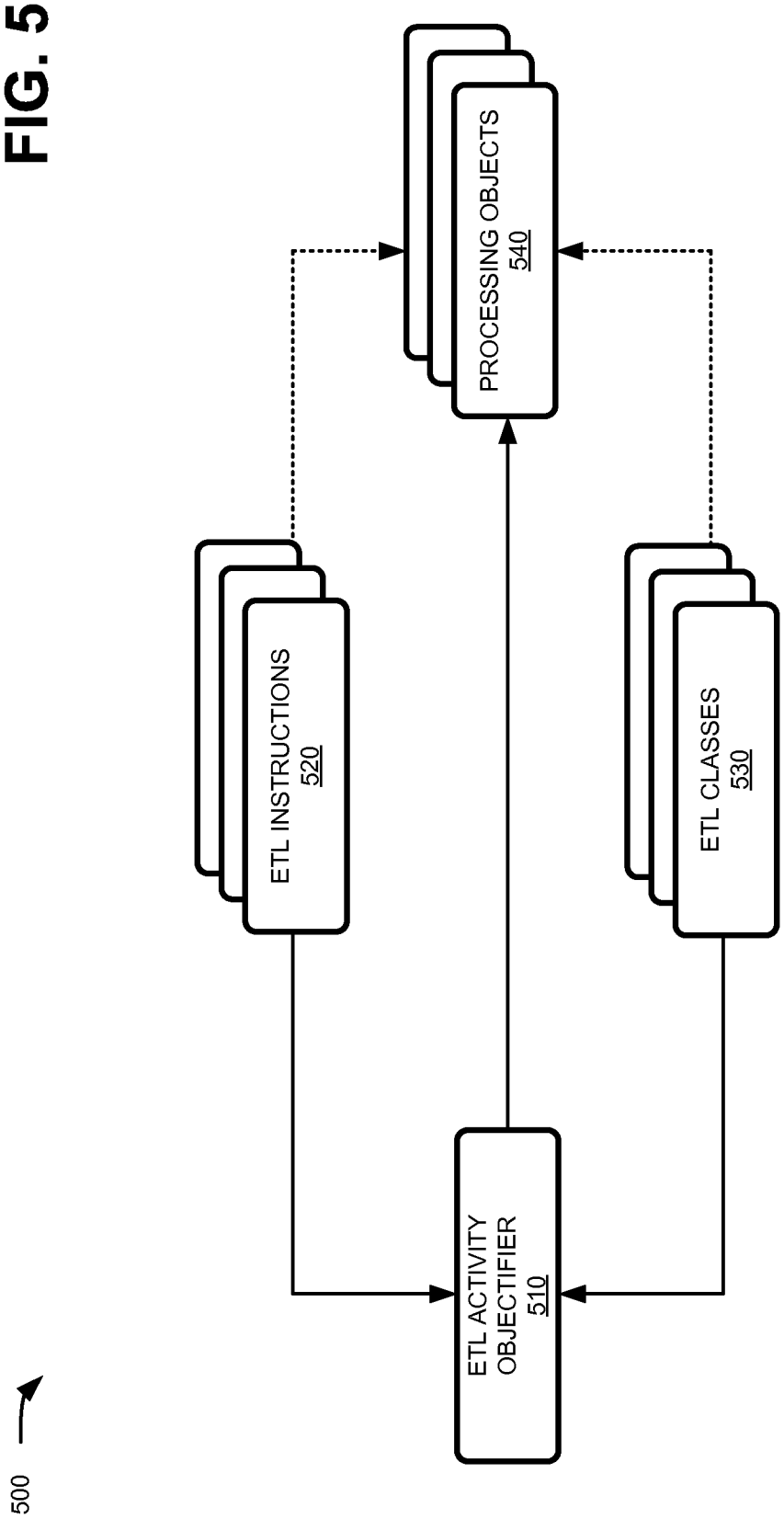
FIG. 5 is a diagram of an example of creating processing objects.

FIG. 5 is a diagram of an example 500 of creating processing objects. As shown in FIG. 5, data management system 140 may use an ETL activity objectifier 510 to create processing objects 540 based on ETL instructions 520 and ETL classes 530.

ETL activity objectifier 510 may create processing objects 540 based on ETL instructions 520 and ETL classes 530. In some implementations, ETL activity objectifier 510 may map or otherwise coordinate ETL classes 530 with ETL instructions 520. ETL instructions 520 may include one or more ETL operations or functions, such as an operation to extract data from a data source, ETL operations to transform data to a particular state or format, ETL operations to provide data to a target destination, etc. ETL classes 530 may include a class created by use an object-oriented programming language, or another type of data structure, corresponding to Java or one or more other types of programming languages.

In one example, ETL activity objectifier 510 may identify a particular ETL instruction 520, such as an instruction to create a list of information retrieved from data source system 130. ETL activity objectifier 510 may associate the particular ETL instructions 520 with a particular ETL class 530, such as a Java class that can be used to create a list of information. ETL activity objectifier 510 may annotate the particular ETL class 530 to refer to the particular ETL instructions 520. In this manner, data management system 140 may create processing objects 540 that are based on a combination of ETL classes 530 and ETL instructions 520. As discussed above, data management system 140 may perform ETL activities by using processing objects 540.

Figure 6:
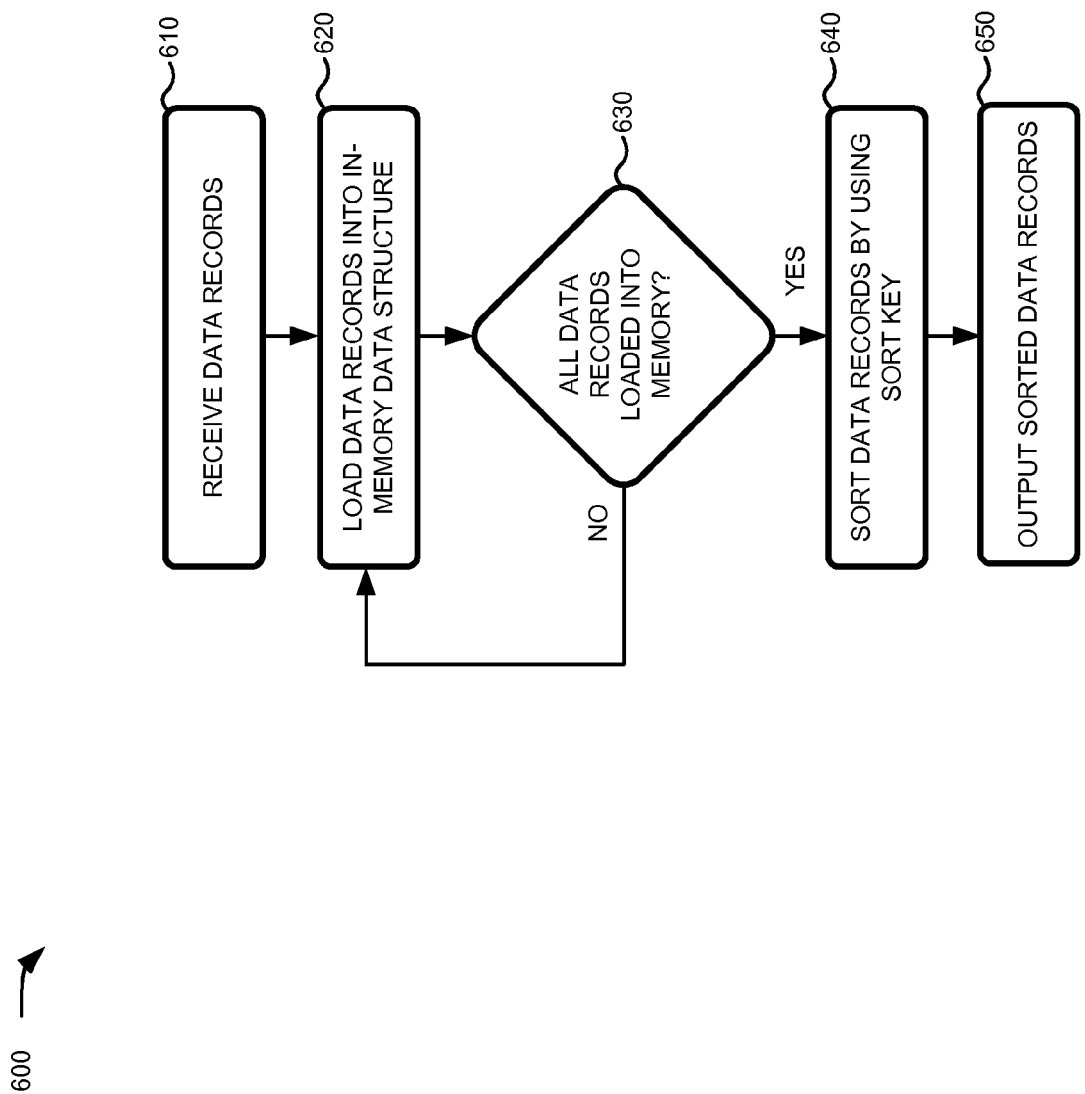
FIG. 6 is a flow chart of an example process for sorting data.

FIG. 6 is a flow chart of an example process 600 for sorting data. In some implementations, process 600 may be performed by data management system 140. Alternatively, or additionally, some or all of process 600 may be performed by one or more other devices, or a group of devices, including or excluding data management system 140.

As shown in FIG. 6, process 600 may include receiving data records (block 610). For example, data management system 140 may perform an ETL activity to extract data records by receiving or retrieving the data records from data source system 130. The data records may include a table of data records, and each data record may include one or more attributes.

Process 600 may further include loading the data records into an in-memory data structure (block 620). For example, data management system 140 may load (i.e., insert) the retrieved data records into a RAM device or another type of volatile memory device. In some implementations, the data records may be loaded into an in-memory array, an in-memory table, an in-memory database, and/or another type of in-memory data structure.

Process 600 may also include determining whether all of the data records have been loaded into the memory (block 630). For example, data management system 140 may determine whether all of the data records that were received or retrieved from data source system 130 have successfully been loaded into a memory of data management system 140.

If all of the data records have not been loaded into the memory (block 630—NO), process 600 may include loading more data records into the in-memory data structure (block 620). For example, when data management system 140 determines that all of the data records received or retrieved from data source system 130 have not been loaded into the in-memory data structure, data management system 140 may continue to load data records into the in-memory data structure.

If all the data records have been loaded into the memory (block 630—YES), process 600 may include sorting the data records by using a sort key (block 640). For example, when data management system 140 determines that all of the data records received or retrieved from data source system 130 have been loaded into the in-memory data structure, data management system 140 may assign a sort key (e.g., an identifier or another type of record attribute) to each data record. In one example, the sort key may be a date from a date field of each record. Data management system 140 may use the sort keys to sort, or otherwise order, the data records. In this manner, data management system 140 may use in-memory processes to perform other ETL activities in addition to sorting.

Process 600 may also include outputting the sorted data records (block 650). For example, data management system 140 may provide the sorted data records to a data storage device of data management system 140 and/or to data destination system 150.

FIG. 7 is a flow chart of an example process 700 for processing batches of data records. In some implementations, process 700 may be performed by data management system 140. Alternatively, or additionally, some or all of process 700 may be performed by one or more other devices, or a group of devices, including or excluding data management system 140.

While FIG. 7 shows the flow chart of example process 700 for processing batches of data, in other implementations, process 700 may include fewer operations, different operations, differently arranged operations, and/or additional operations than depicted in FIG. 7. For example, process 700 may include a particular example of processing batches of data records within the context of providing data to data destination system 150. Alternatively, or additionally, process 700 may be applicable to other types of ETL activities, such as extracting data records from data source system 130, sorting the data records, merging the data records with one or more other data records, etc.

As shown in FIG. 7, process 700 may include adding data records to a batch of data records (block 710). For example, data management system 140 may associate one or more data records with one or more other data records in order to create a batch of data records. A batch of data records may correspond to a particular quantity of data records. The quantity of data records in a batch of data records may be determined based on, for example, an input from an operator of data management system 140, an input from client device 110, a quantity or a percentage of available system resources, a quantity or a percentage of data records to be processed, the types of ETL activities that are to be performed, etc.

Process 700 may further include determining whether the batch of data records is full (block 715). For example, data management system 140 may monitor a quantity of data records that have been added to the batch of data records, and may determine whether the batch of data records is full based on the monitored quantity of data records. In one example, data management system 140 may determine that the batch of data records is full when the monitored quantity of data records is equal to the particular quantity of data records specified by the input from the operator or client device 110.

If the batch of data records is not full (block 715—NO), process 700 may include adding additional data records to the batch of data records (block 710). For example, when data management system 140 determines that the batch of data record is not full, data management system 140 may continue to add data records to the batch of data records.

If the batch of data records is full (block 715—YES), process 700 may include providing the batch of data records to a target destination (block 720). For example, when data management system 140 determines that the batch of data records is full, data management system 140 may provide the batch of data records to a target destination, such as data destination system 150.

Process 700 may include determining whether a batch error has occurred (block 725). For instance, data management system 140 may detect a batch error that occurs while the data management system 140 provides the batch of data records to the target destination. A batch error may include any type of problem that occurs while performing an ETL activity with respect to a batch of data. For instance, the batch error may include a conflict that arises between two or more data records while attempting to update data destination system 150 with the batch of data records, difficulty (e.g., failure) in establishing or maintaining a connection with data destination system 150, etc. Data management system 140 may determine that no batch error has occurred when data management system 140 successfully provides the entire batch of data records to data destination system 150 without detecting any batch error.

If no batch error has occurred (block 725—NO), process 700 may include adding data records to create another batch of data for processing (block 710). For instance, when data management system 140 determines that no batch error has occurred, data management system 140 may create another batch of data records for processing.

If a batch error has occurred (block 725—YES), process 700 may include providing data records individually to the target destination (block—730). For example, when data management system 140 determines that the batch error has occurred, data management system 140 may react to the batch error by selecting individual data records from the batch of data records, and by providing the selected data records to data destination system 150 individually (i.e., one selected data record at a time).

Process 700 may include determining whether a processing error has occurred (block 735). For example, while data management system 140 provides a particular data record to data destination system 150, data management system 140 may determine whether any type of processing error has occurred with respect to the particular data record. Similar to a batch error, as described above, a processing error may include any type of problem that occurs while performing an ETL activity with respect to a data record. For instance, a processing error may include a conflict that arises between two or more data records while attempting to update data destination system 150 with the particular data record, difficulty (e.g., failure) in establishing or maintaining a connection with data destination system 150, etc.

If no processing error has occurred (block 735—NO), process 700 may include continuing to provide data records individually to the target destination (block 730). For example, when data management system 140 communicates a particular data record to data destination device 150 without detecting a processing error, data management system 140 may provide another data record, from the batch of data records, to data destination system 150.

If a processing error has occurred (block 735—YES), process 700 may include performing an error handling process (block 740). For example, data management system 140 may perform one or more error handling operations in response to detecting a processing error. An error handling process, as described herein, may include one or more of a variety of error handling operations, such as creating an error report that identifies the data record corresponding to the processing error and/or the ETL activity corresponding to the processing error, communicating the error report to an operator of data management system 140 and/or to client device 110, etc.

In some implementations, data management system 140 may continue providing other data record, from the batch of data records, to data destination system 150 after performing the error handling process for a particular data record from the batch of data records. In some implementations, after performing the handling process for the particular data records and/or after there are no more data records, from the batch of data records, to provide to data destination system 150, data management system 140 may create another batch of data records for processing.

Systems and/or methods described herein may provide efficient solutions to the provision of ETL services. For example, a data management system may receive ETL instructions, may identify ETL activities based on the ETL instructions, and may determine a processing sequence corresponding to the ETL activities. In accordance with the processing sequence, the data management system may perform the ETL activities by using processing objects that are based on the ETL activities. The data management system may perform one or more of the ETL activities using entirely in-memory processes and/or data structures and/or one or more batches of data. Accordingly, systems and/or methods described herein may enhance ETL services by using processing objects, in-memory processes, and/or by processing data in batches.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 4, 6, and 7, the order of the blocks may be modified in other implementations. Further, non-dependent blocks may be performed in parallel.

It will be apparent that example aspects, as described herein, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve components that perform one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computing device, instructions for extracting, transforming, and loading data;
    mapping, by the computing device, the instructions to a plurality of classes that are in one or more types of object-oriented programming languages;
    creating, by the computing device, a plurality of processing objects based on the plurality of classes and the instructions; and
    performing, by the computing device, a plurality of data processing activities by using the plurality of processing objects.

2. The method of claim 1, where receiving the instructions includes:
    receiving an Extensible Markup Language (XML) file that includes the instructions.

3. The method of claim 1, where performing the plurality of data processing activities includes:
    extracting the data from one or more data sources,
    sorting the data,
    merging the data with other data to produce merged data,
    deleting duplicate data in the merged data to produce processed data, and
    providing the processed data to a destination device.

4. The method of claim 1, further comprising:
    identifying processing dependencies between two or more of the plurality of data processing activities,
        the processing dependencies indicating that a first activity of the two or more of the plurality of data processing activities is dependent on a second activity of the two or more of the plurality of data processing activities, and
    determining a processing sequence based on the processing dependencies,
        performing the plurality of data processing activities including:

performing the plurality of data processing activities in accordance with the processing sequence and by using the plurality of processing objects.

5. The method of claim 1, where creating the plurality of processing objects comprises:
annotating the plurality of classes to refer to the instructions that are mapped to the plurality of classes, and
creating the plurality of processing objects based on the plurality of classes and the instructions.

6. The method of claim 1, where performing the plurality of data processing activities includes:
receiving or retrieving data records that include portions of the data,
loading the data records into an in-memory data structure that is stored in a memory of the computing device,
sorting the data records in the memory of the computing device, and
outputting the sorted data records to another device.

7. The method of claim 6, where sorting the data records includes:
determining whether all of the data records, retrieved from a particular data source, have been loaded into the in-memory data structure, and
sorting the data records when all of the data records have been loaded into the in-memory data structure.

8. The method of claim 1, where performing the plurality of data processing activities includes:
adding data records, that include a portion of the data, to a batch,
providing the batch to a destination device,
determining whether an error has occurred while providing the batch to the destination device, and
providing the data records, from the batch, individually to the destination device when the error has occurred.

9. The method of claim 8, where adding the data records to the batch includes:
receiving a particular number from an operator of the computing device,
determining whether a quantity of the data records in the batch is less than the particular number, and
continuing to add more of the data records to the batch when the quantity of the data records in the batch is less than the particular number.

10. The method of claim 8, where providing the data records individually includes:
providing a particular data record, of the data records, to the destination device,
determining whether another error has occurred that is associated with the particular data record,
creating an error report that identifies the particular data record when the other error has occurred, and
transmitting the error report to an operator of the computing device.

11. The method of claim 8, where the error comprises one of:
a conflict between a first data record, of the data records, and a second data record that is stored by the destination device,
a failure associated with establishing a connection with the destination device, or
a failure associated with maintaining the connection with destination device.

12. A system comprising:
one or more processors to:
receive instructions for handling data from a plurality of data sources,
map each of the instructions to one of a plurality of classes that are in one or more types of object-oriented programming languages,
annotate the plurality of classes to refer to the instructions that are mapped to the plurality of classes,
create the plurality of processing objects based on the instructions and the plurality of annotated classes, and
perform, by using the plurality of processing objects, a plurality of data processing activities to process the data.

13. The system of claim 12, where, when performing the plurality of activities, the one or more processors are to:
identify the plurality of data processing activities based on the instructions,
identify processing dependencies between two or more of the plurality of data processing activities,
determine a processing sequence based on the processing dependencies, and
perform the plurality of data processing activities in accordance with the processing sequence.

14. The system of claim 12, where, when performing the plurality of data processing activities, the one or more processors are to:
receive the data from the plurality of data sources,
load the data into an in-memory data structure that is stored in a memory of the system,
sort the data in the memory, and
output the sorted data to another device.

15. The system of claim 12, where, when performing the plurality of data processing activities, the one or more processors are to:
create a batch based on data records that include a portion of the data,
determine that an error has occurred while providing the batch to a destination device, and
provide each of the data records individually to the destination device after determining that the error has occurred.

16. The system of claim 15, where, when providing each of the data records individually to the destination device, the one or more processors are to:
determine whether a processing error has occurred that is associated with a particular data record of the data records,
generate an error report that identifies the particular data record when the other error has occurred, and
provide the error report to a client device associated with the system.

17. A non-transitory computer-readable medium storing instructions, the instructions comprising:
one or more instructions that, when executed by one or more processors of a computer device, cause the one or more processors to:
receive instructions associated with extracting, transforming, and loading data;
identify a plurality of data processing activities based on the instructions;
determine a processing sequence for performing the plurality of data processing activities;
associate the instructions with a plurality of classes that are in one or more types of object-oriented programming languages;
create, based on the plurality of classes and the instructions, a plurality of processing objects corresponding to the plurality of data processing activities; and perform the plurality of data processing activities in accordance with the processing sequence and by using the plurality of processing objects.

18. The non-transitory computer-readable medium of claim 17, where the instructions further comprise:
one or more instructions that, when executed by the one or more processors of the computer device, cause the one or more processors to:
receive data records that include portions of the data,
load the data records into an in-memory data structure that is stored in a memory of the computer device,
sort the data records in the memory of the computer device, and
output the sorted data records to another device.

19. The non-transitory computer-readable medium of claim 17, where the instructions further comprise:
one or more instructions that, when executed by the one or more processors of the computer device, cause the one or more processors to:
add data records to a batch,
the data records including a portion of the batch,
determine that a batch error has occurred while providing the batch to a destination device,
the batch error including one of:
a conflict between one of the data records and another data record stored by the destination device, or
a failure to establish or maintain a connection with the destination device, and
provide the data records, from the batch, individually to the destination device when the batch error has occurred.

20. The non-transitory computer-readable medium of claim 17, where the instructions further comprise:
one or more instructions that, when executed by the one or more processors of the computer device, cause the one or more processors to:
annotate, before creating the plurality of processing objects, the plurality of classes to refer to the instructions that are associated with the plurality of classes.

\* \* \* \* \*